United States Patent [19]

Brunsch et al.

[11] 4,414,860

[45] Nov. 15, 1983

[54] CONNECTING ROD FOR AN ENGINE

[75] Inventors: Klaus Brunsch, Weidach; Rudolf Schindler, Riemerling, both of Fed. Rep. of Germany

[73] Assignee: Messerschmitt-Bölkow-Blohm Gesellschaft mit beschrankter Haftung, Munich, Fed. Rep. of Germany

[21] Appl. No.: 217,040

[22] Filed: Dec. 16, 1980

[30] Foreign Application Priority Data

Dec. 19, 1979 [DE] Fed. Rep. of Germany ...... 2951111

[51] Int. Cl.³ .............................................. G05G 1/00
[52] U.S. Cl. .................................................. 74/579 E
[58] Field of Search ............. 74/579 E, 579 R, 579 F, 74/581

[56] References Cited

U.S. PATENT DOCUMENTS

| | | | |
|---|---|---|---|
| 3,768,334 | 10/1973 | Ditlinger | 74/579 R |
| 3,977,274 | 8/1976 | Ditlinger | 74/579 R |
| 4,038,885 | 8/1977 | Jonda | 74/581 |
| 4,183,261 | 1/1980 | Eiselbrecher et al. | 74/579 R |
| 4,216,682 | 8/1980 | Ban et al. | 74/579 E |

FOREIGN PATENT DOCUMENTS 54-20259  2/1979  Japan .................... 74/579 R

*Primary Examiner*—Kenneth Dorner
*Attorney, Agent, or Firm*—Toren, McGeady and Stanger

[57] ABSTRACT

A connecting rod assembly includes an axially elongated member with openings spaced apart in the axial direction. The axis of the openings extend perpendicularly to the axis of the member. A connecting rod shaft extends in the axial direction of the member between the two openings. A fiber reinforced plastics material belt extends around the first and second openings and also around the connecting rod shaft. Oblique cuts are formed in the belt on opposite sides of the connecting rod shaft adjacent one of the openings. A highly heat-resistant adhesive is placed in the oblique cuts for splicing the belt together.

7 Claims, 4 Drawing Figures

CONNECTING ROD FOR AN ENGINE

The invention relates to a connecting rod for engines with a rotating crankshaft.

Such known connecting rods are made of high-strength metal, mainly steel, for the absorption of tension loads, compression loads and bending loads. In addition, the known connecting rods are of divided construction with screw connections for installation around the crankshaft bearing. Due to this division, the flow of force for the tension load and the bending load is disturbed and a conglomeration of mass results at the connecting elements. Altogether this construction and selection of materials results in high inertia forces which must be compensated by other structural measures.

It is the task of the invention to create a connecting rod which has no conglomeration of material. The connecting rod of the invention guarantees an undisturbed flow of force for all loads and it has a low mass.

This task is solved by a connecting rod as set forth in the claims.

Due to the selection of the materials, the connecting rod according to the invention has a low weight which so far was not achieved for such connecting rods. With the exception of the bearing shells for the piston pin and the crankshaft, only fiber reinforced plastics material is used. An additional reduction in weight is achieved by assembling the connecting rod without special connecting elements in a manner that is compatible with the material. Consequently the inertia forces are greatly reduced whereby the crankshaft bearings can be kept lighter and maximum quiet running of the engine is achieved.

The features of the invention and their technical advantages are evident in the following description of an embodiment of the invention.

Figure 1:
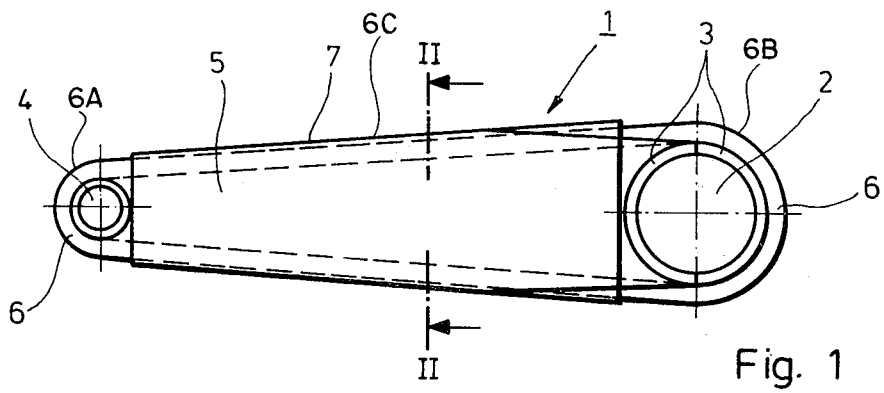
FIG. 1 shows a lateral view of a connecting rod.
Figure 3A:
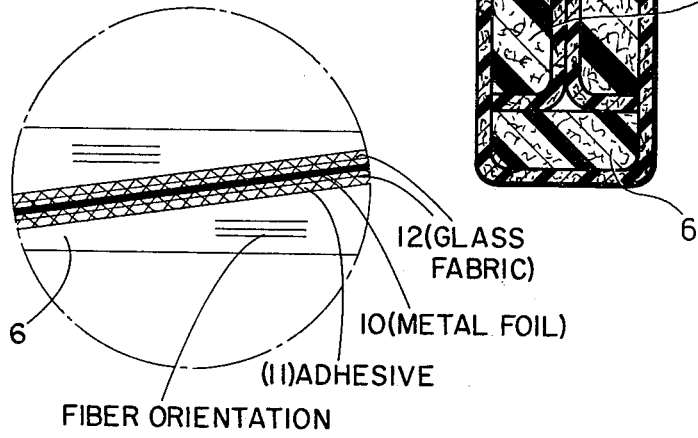
FIG. 3A is an enlarged detail view of the encircled portion of FIG. 3.

The connecting rod assembly 1 according to FIG. 1 has a crankshaft bearing 2 with divided bearing shells 3, a connecting rod 4 and a connecting rod shaft 5 extending in the axial direction between the crankshaft bearing and the connecting rod. The connecting rod is enclosed by a revolving or encircling belt 6 of unidirectional fibers extending between and around the ends of the assembly 1 formed by the openings for the crankshaft bearing 2 and for the connecting rod 4, extending in the direction of the belt and embedded in a synthetic resin matrix. The unidirectional fibers are shown in FIG. 3A. The belt is made of first, second and third parts, 6A, 6B and 6C, respectively. The connecting rod shaft 5 is covered between the crankshaft bearing 2 and the connecting rod 4 with one or more fiber layers 7, impregnated with synthetic resin.

Figure 2:
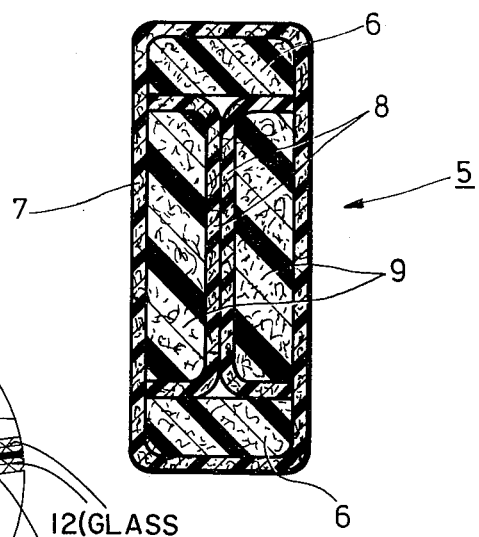
FIG. 2 shows an enlarged section through the connecting rod along line II—II of FIG. 1.

The construction of the connecting rod shaft 5 is shown in detail in the sectional drawing of FIG. 2. Between the revolving or encircling belt 6 two U-shaped webs 8 are inserted and between these a bipartite core 9 is arranged. The webs 8 and the cores 9 are pressed out of fiber reinforced plastics material. The entire connecting rod shaft 5 is enclosed by the wound layers 7. In this embodiment of the shaft, the cores 9 serve to absorb the compression loads, the belts 6 absorb the tension loads and the webs 8 together with the winding 7 serve as a shear bond to absorb the bending load of the connecting rod. The described construction of the connecting rod shaft 5 should only be evaluated as an example for a possible embodiment. It lies within the scope of the invention to also absorb the occurring forces and loads with other arrangements of the pressure core and the shear bond. Depending on the occurring loads, various materials for instance glass, plastics material and carbon are suitable as a material for the fibers. Carbon fibers are preferred because of their high strength properties and their great modulus of elasticity.

Figure 3:
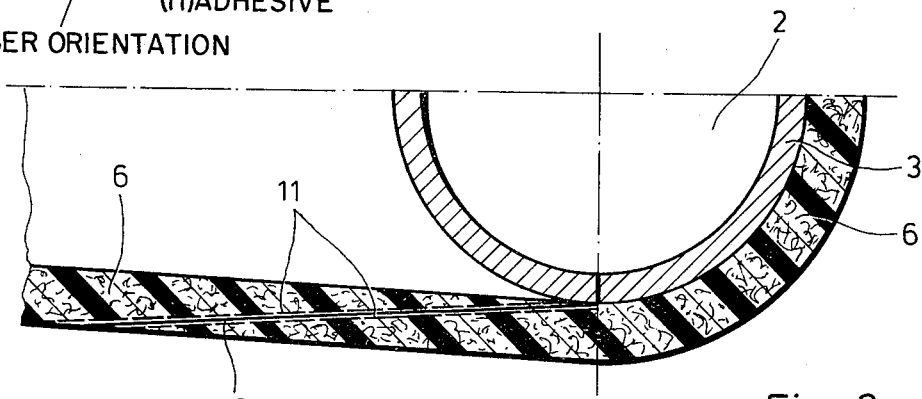
FIG. 3 shows a section of half of the connecting rod transversely through the longitudinal direction of the connecting rod in the region of the splice.

FIG. 3 shows the possibility of assembly and disassembly of the connecting rod 1. For this purpose the belt 6 is obliquely separated on both sides of the crankshaft bearing 2, a metal foil 10 is placed into the separating groove and is connected on both sides with the belt 6 by means of a highly heat resistant adhesive 11. For electrical insulation of the metal foil 10 with respect to the parts of the belt 6, always a thin glass fabric can be interposed. If no heat resistant fast acting adhesive is available, assembly and disassembly can, if necessary, also take place in a heating chamber. Disassembly is also possible by means of inductive heating of the metal foil 10. Note FIG. 3a showing a detail of the oblique cut of the belt 6.

We claim:

1. Connecting rod assembly for engines with rotating crankshaft, comprising an axially elongated member having a first opening and a second opening spaced apart in the axial direction of said member and the first opening located adjacent one end of said member for receiving a connecting rod and the second opening located adjacent the other end of said member for receiving a crankshaft bearing, the axes of said first and second openings extend substantially perpendicularly of the axis of said member, a connecting rod shaft extends in the axial direction of said member between the first and second openings, a belt of fiber reinforced plastics material extends around said first opening and said second opening and said connecting rod shaft extending between said openings, said belt comprises a first part partly encircling the axis of said first opening with said first part having a pair of ends spaced apart in the encircling direction, a second part partly encircling the axis of said second opening with said second part having a pair of ends spaced apart in the encircling direction, and a pair of third parts each located on an opposite side of the axis of said member and each extending between said first and second parts with each said third part extending between a different one of the ends on said first part and a different one of the ends on said second part, said first, second and third parts of said belt each having an inside surface closer to the axes of said first and second openings and said member and an outside surface, said belt is cut obliquely of the direction of said third parts extending between said first and second parts and adjacent the ends of said second part from the inside surface of said belt at the ends of said second part to the outside surface of said belt at a location spaced between the ends of said first and second parts with the oblique cuts extending approximately parallel to the axial direction of said member, each said oblique cut having a pair of facing oblique cut surfaces and a highly heat-resistant adhesive placed between the oblique cut surfaces of said oblique cut for splicing said belt together.

2. Connecting rod asssembly as set forth in claim 1, wherein a metal foil is placed in and between the facing oblique cut surfaces of each of said oblique cuts in said belt and is glued to the surfaces of said belt in each said oblique cut.

3. Connecting rod assembly, as set forth in claim 2, wherein a thin glass fabric strip is interposed between the opposite sides of said metal foil and the adjacent oblique cut surfaces of said belt in each said oblique cut.

4. Connecting rod assembly, as set forth in claim 1, 2 or 3, wherein said connecting rod shaft comprises a pair of elongated U-shaped webs each comprising a pair of spaced legs interconnected by a bight portion with said legs and bight portion elongated in the axial direction of said member and extending between the first and second openings in said member with the bight portions of said webs disposed in contacting engagement, a core of fiber reinforced plastics material positioned within each of said U-shaped webs for filling said webs between said legs thereof.

5. Connecting rod assembly, as set forth in claim 4, wherein wound layers extend around said connecting rod shaft between the first and second openings in said member.

6. Connecting rod assembly, as set forth in claim 1, wherein said fiber reinforced plastics material comprises carbon fibers.

7. Connecting rod assembly, as set forth in claim 1, wherein said fiber reinforced plastics material includes unidirectional fibers extending in the direction of the belt.

* * * * *